(12) United States Patent
Vaa et al.

(10) Patent No.: US 7,519,295 B2
(45) Date of Patent: Apr. 14, 2009

(54) APPARATUS AND METHOD FOR COMMISSIONING AN OPTICAL TRANSMISSION SYSTEM

(75) Inventors: Michael Vaa, Little Silver, NJ (US); Franklin W. Kerfoot, III, Red Bank, NJ (US); Georg H. Mohs, East Brunswick, NJ (US); Ekaterina A. Golovchenko, Colts Neck, NJ (US); Robert L. Lynch, Colts Neck, NJ (US); Stuart M. Abbott, Marlboro, NJ (US); Howard D. Kidorf, Red Bank, NJ (US); Bamdad Bakhshi, Jersey City, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 630 days.

(21) Appl. No.: 10/975,606

(22) Filed: Oct. 28, 2004

(65) Prior Publication Data
US 2005/0147346 A1 Jul. 7, 2005

Related U.S. Application Data

(60) Provisional application No. 60/515,968, filed on Oct. 30, 2003.

(51) Int. Cl.
| | |
|---|---|
| H04B 10/08 | (2006.01) |
| H04B 10/12 | (2006.01) |
| H04B 10/00 | (2006.01) |
| H04J 14/02 | (2006.01) |

(52) U.S. Cl. .................. 398/81; 398/9; 398/29; 398/147; 398/159
(58) Field of Classification Search ........ 398/9, 398/81, 147–149, 159, 29
See application file for complete search history.

(56) References Cited

U.S. PATENT DOCUMENTS

| 6,055,082 A * | 4/2000 | Chikuma ............... 398/31 |
| 6,545,800 B1 * | 4/2003 | Wilson et al. ........... 359/341.4 |
| 6,937,788 B2 * | 8/2005 | Ramachandran ........... 385/28 |
| 2004/0037569 A1 * | 2/2004 | Kamalov et al. .......... 398/162 |

OTHER PUBLICATIONS

International Search Report with Written Opinion dated Sep. 21, 2006 received in corresponding International Patent Application Serial No. PCT/US04/36314 (14 pages).

* cited by examiner

*Primary Examiner*—Dalzid Singh
(74) *Attorney, Agent, or Firm*—Grossman Tucker Perreault & Pfleger, PLLC

(57) ABSTRACT

An apparatus and method directed to testing and optimizing performance of an optical transmission system is disclosed, including at least one broadband dispersion compensation unit (DCU) or at least one depolarization device. The depolarization device may be used alone or in combination with the at least one broadband DCU. A method for optimizing performance of data channels in initial loading (IL) and full loading (FL) configurations of the optical transmission system is also disclosed.

17 Claims, 3 Drawing Sheets

APPARATUS AND METHOD FOR COMMISSIONING AN OPTICAL TRANSMISSION SYSTEM

CROSS-REFERENCE TO RELATED APPLICATIONS

This application claims the benefit of U.S. provisional patent application Ser. No. 60/515,968 filed Oct. 30, 2003, the entirety of which is herein incorporated by reference.

BACKGROUND

Aspects of the present invention generally relate to optical transmission systems. In particular, aspects of the present invention relate to an apparatus and method for testing and optimizing the performance of an optical transmission system.

Most modern optical transmission systems use wavelength division multiplexing (WDM) techniques to transmit a plurality of data channels via a common optical path comprising single-mode optical fibers and such means for optical amplification and filtering as needed to maintain acceptable data channel powers and signal-to-noise ratios. Such systems can provide long-haul communication links, for example, trans-oceanic communication links.

To achieve optimal performance of the data channels, first at initial loading (IL) and then at full loading (FL), a transmission system undergoes a series of complex optimization routines known in the art as commissioning tests. One such routine relates to defining optimal settings for chromatic dispersion compensation for each data channel. However, conventional commissioning tests are performed using time-consuming, invasive procedures that substantially increase the overall cost of the transmission system. Additionally, in operation, implementation of multiple channels at installation or implementation of capacity upgrades in the transmission system may require repeating costly and time-consuming commissioning tests.

Therefore, there is a need in the art for an improved apparatus and method for testing and optimizing an optical transmission system.

SUMMARY OF THE INVENTION

Embodiments of the present invention generally are directed to an apparatus and a method for commissioning (i.e., testing and optimizing) an optical transmission system.

In accordance with one aspect of the present invention, there is provided an apparatus for testing and optimizing performance of an optical transmission system having a transmitting terminal, a receiving terminal and at least one fiber-optic transmission span. The apparatus includes at least one broadband dispersion compensation unit (DCU) coupled to the fiber-optic transmission span. In one embodiment, the apparatus further comprises a depolarization device coupled to the transmitting terminal. In another embodiment, there is provided a depolarization device coupled to a broadband DCU, which is coupled to the transmitting terminal.

In accordance with another aspect of the present invention, there is provided a method for testing and optimizing performance of an optical transmission system. The method comprises providing a transmitting terminal, a receiving terminal, and a fiber-optic transmission span coupled between the transmitting and receiving terminals. The method further comprises providing at least one broadband dispersion compensation unit (DCU) coupled to the fiber-optic transmission span, performing a dispersion sweep, testing the performance of data channels of the fiber-optic transmission span, defining an optimal amount of dispersion compensation for each data channel, configuring the transmitting and receiving terminals to the optimal amount of dispersion compensation for each data channel, and removing the at least one broadband DCU from the fiber-optic transmission span.

In accordance with another aspect of the present invention, there is provided a method for testing and optimizing performance of an optical transmission system. The system includes a transmitting terminal, a receiving terminal, and a fiber-optic transmission span coupled between the transmitting and receiving terminals. The method comprises providing at least one depolarization device, depolarizing data channels transmitting from the transmitting terminal, performing a dispersion sweep, testing the performance of the data channels of the fiber-optic transmission span, defining an optimal amount of dispersion compensation for each data channel, and configuring the transmitting and receiving terminals to the optimal amount of dispersion compensation for each data channel. In an embodiment, the method may include removing the at least one depolarization device from the optical transmission system.

BRIEF DESCRIPTION OF THE DRAWINGS

So that the manner in which the above recited features of embodiments of the present invention can be understood in detail, a more particular description of aspects of the present invention, briefly summarized above, may be had by reference to embodiments, some of which are illustrated in the appended drawings. It is to be noted; however, the appended drawings illustrate only typical embodiments of the present invention and are therefore not to be considered limiting of its scope, for the present invention may include other effective embodiments.

To facilitate understanding, identical reference numerals have been used, where possible, to designate identical elements common to the figures.

DETAILED DESCRIPTION

Aspects of the present invention are generally directed to an apparatus and a method for commissioning an optical transmission system, such as a long-haul undersea or terrestrial fiber-optic transmission system.

The term "dispersion sweep" in the context of the present invention is to be understood as varying the dispersion compensation common to two or more data channels at the transmitting terminal, the receiving terminal, or both, by use of at least one broadband DCU and measuring performance of the two or more data channels for each value (or set of values) of dispersion compensation. A one-dimensional dispersion sweep is performed when only the dispersion compensation is varied at the transmitting terminal or receiving terminal. A two-dimensional dispersion sweep is performed when dispersion compensation is varied at both the transmitting and receiving terminal.

Figure 1:
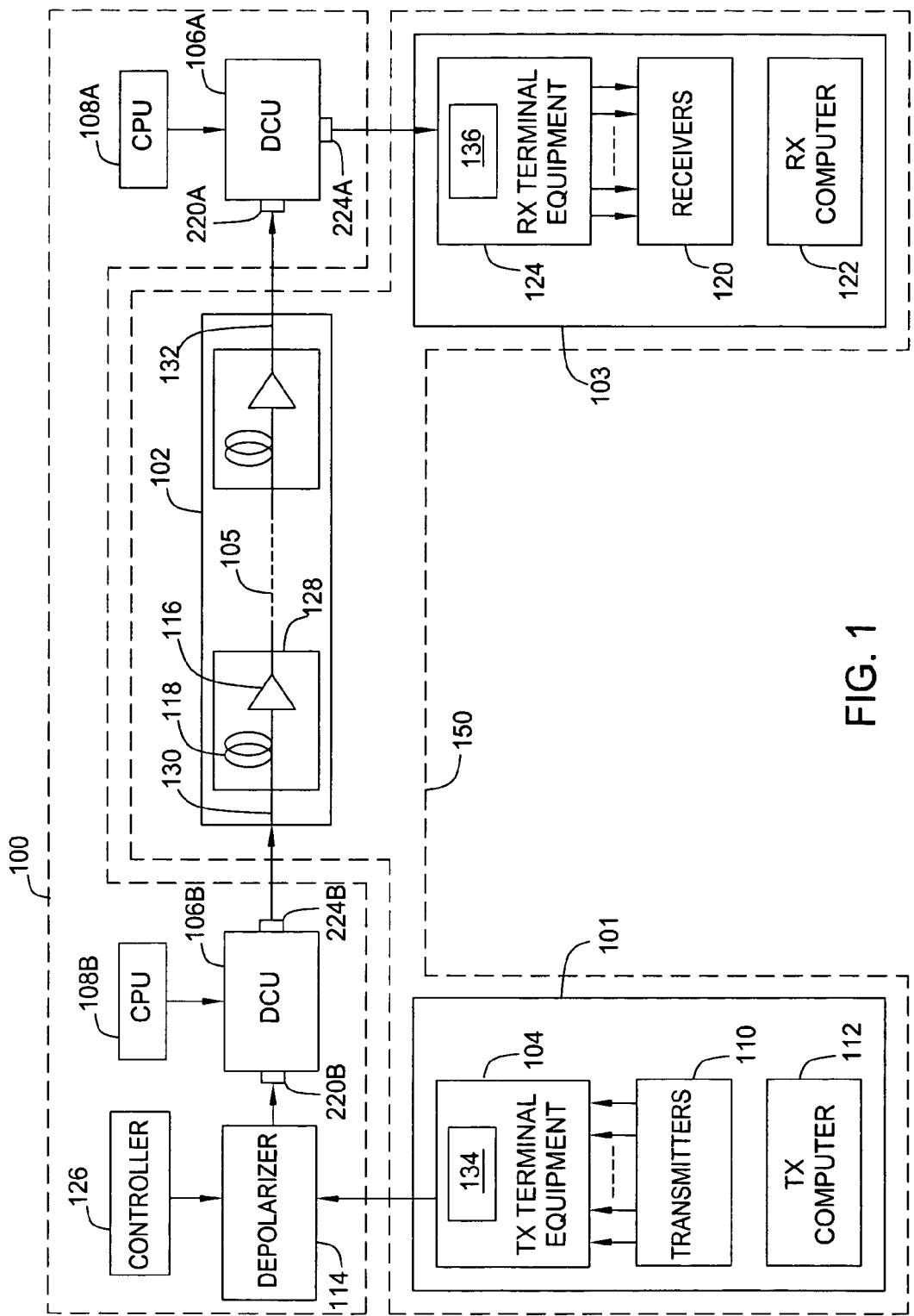
FIG. 1 is a schematic diagram of an apparatus for testing and optimizing an optical transmission system in accordance with one embodiment of the present invention.

FIG. 1 depicts a schematic diagram of an exemplary apparatus 100 for commissioning an optical transmission system 150 in accordance with one embodiment of the present invention. Illustratively, the system 150 is a wavelength division multiplexed (WDM) fiber-optic transmission system comprising a plurality of single-mode transmission fibers (e.g., from about 2 to 16 or more fibers), each transmitting a plurality of data channels (e.g., from about 8 to 128 or more data channels). The embodiment shown depicts a portion (span) 102 of the system 150 relating to one transmission fiber 105 of a plurality of such transmission fibers, a transmitting terminal 101 and a receiving terminal 103.

In one exemplary embodiment, the apparatus 100 comprises a broadband dispersion compensation unit (DCU) 106B, an optional broadband DCU 106A, and an optional depolarization device (or depolarizer) 114. Alternatively, the apparatus 100 includes both the broadband DCU 106A and the broadband DCU 106B. In a further alternative embodiment, the apparatus 100 may include a depolarization device 114 only. This device 114 can be included on the transmit side of the fiber-optic transmission span 102.

When the fiber-optic transmission span 102 is relatively short (e.g., about 500-1000 km), either one of the broadband DCUs 106A or 106B may be optional. The broadband DCUs 106A, 106B and the depolarization device 114 are electronically operated devices illustratively controlled using CPUs 108A, 108B and a controller 126, respectively.

The DCU is a broadband optical device that has a controllable amount of chromatic dispersion. The term "broadband" in the context of the present invention is to be understood as the ability of the DCUs to change the dispersion compensation value for many channels at the same time with approximately the same amount. In other words, the dispersion compensation value is common to all channels across a wavelength range exceeding that of the optical bandwidth of the transmission system. This is different from dispersion compensation devices that provide tunable dispersion compensation within a narrow spectral region (typically covering one or only a few channels).

Herein, the broadband DCUs and their components (discussed in detail with reference to FIG. 2 below) are identified using the same reference numerals, except the suffixes "A" and "B" are added, when appropriate, to differentiate between specific devices. Such devices may also be referred to by their reference numeral without any appended suffix.

The fiber-optic transmission span 102 generally comprises a plurality of segments 128, each segment including a fiber section 118 (e.g., a 40-150 km fiber section) and a fiber-optic amplifier 116, such as an erbium-doped fiber-optic amplifier, a Raman fiber-optic amplifier, and the like. In the depicted embodiment, the fiber-optic transmission span 102 illustratively provides point-to-point connection. In an alternate embodiment (not shown), the fiber-optic transmission span 102 may additionally comprise at least one branching unit (e.g., add-and-drop branching unit) or be a portion of a fiber-optic network.

The transmitting (or TX) terminal 101 illustratively comprises a transmitting terminal equipment unit 104, a transmitters module 110 including N laser transmitters of WDM channels, and a computer 112 administering operation of the TX terminal. Herein, N is a sum of a maximum number of data channels and optional service channels propagating in the fiber 105. The unit 104 generally includes a block 134 for pre-compensating dispersion in data channels, channel optical filters, and data channel opto-electronic modulators (e.g., $LiNbO_3$ Mach-Zehnder modulators) operating at about 2.5-40 GHz, among other devices. Spacing, in the frequency domain, between adjacent channels is generally about 25-100 GHz, and the channels are disposed proximate to a central wavelength of about 1550 nm.

The receiving (or RX) terminal 103 illustratively comprises a receiving equipment unit 124, a receivers module 120 including electronic demodulators of the detected optical signals, and a computer 122 administering operation of the RX terminal. The RX terminal equipment unit 124 generally includes a block 136 for post-compensating dispersion in data channels, channel optical filters and photo-electronic receivers selectively detecting the optical signal in a corresponding WDM channel, among other devices.

Those skilled in the art will recognize that, for ease of explanation, the system 150 is depicted in a highly simplified form. For example, the TX terminal 101 and the RX terminal 103 may each be configured as a transceiver terminal to perform both transmitting and receiving functions for respective WDM channels, as well as comprise portions relating to other fiber-optic transmission spans of the system 150.

An optical input 220A and an optical output 224A of the broadband DCU 106A are coupled to an output fiber 132 of the fiber-optic transmission span 102 and an input of the RX terminal 103, respectively. Accordingly, an optical input 220B and an optical output 224B of the broadband DCU 106B are coupled to an output of the TX terminal 101. The depolarization device or depolarizer 114 has an optical output coupled to the optical input of the broadband DCU 106B. Alternatively, an optical output of the depolarization device 114 may be coupled to an input fiber 130 of the fiber-optic transmission span 102. Such couplings are achieved using a known splicing technique or, alternatively, known fiber-optic connectors (e.g., FC-PC connectors).

Performance is measured over a given time interval when it is desired to optimize certain parameters. When doing so, one must average over all States of Polarization (SOP) within a sampling time. The depolarization device 114 is a device for modulating an SOP of the propagating light or signal transmitted on the line, within a certain time constant. Specifically, the device 114 should significantly change the SOP on a timescale substantially faster than the characteristic time constants of the system, including the relaxation time of the erbium-doped fiber-optic amplifiers 116 in the fiber-optic transmission span 102 and performance sampling intervals of the RX terminal used in the system optimization process. Polarization scrambling several WDM channels in a common polarization scrambling device is described in a printed publication by Neal S. Bergano and C. R. Davidson, entitled: *Four-Channel WDM Transmission Experiment Over Transoceanic Distance*, Paper PD7, Topical Meeting on Optical Amplifiers and Their Applications, August 1994, the entirety of which is herein incorporated by reference.

The SOP should change in a manner as to progress through all States of Polarization. Ideally, the device 114 should be capable of averaging all SOP within a given sampling time. To obtain the transmission performance of a particular channel, one would take samples over time for about several msecs or seconds.

One example of a depolarizer or depolarization device is a polarization scrambler. One such polarization scrambler capable of performing the function of the device 114 in accordance with aspects of the present invention is identified as Model No. PS-155-A, available from FIBERPRO of San Jose, Calif. It should be understood by one of ordinary skill in the art that other devices capable of depolarizing a transmission signal are contemplated and within the scope of the present invention. Examples include a high PMD (Polarization Mode Dispersion) device (or a cascade of devices) that will cause a polarized signal of a finite optical bandwidth to be depolarized at the device output by forcing different spectral components of the signal to assume different polarization states. An example of such a device is Model No. M-9706-AFP368, available from EXFO of Vanier, Quebec.

The depolarizer or depolarization device 114 assists in the commissioning of the system 150 by stabilizing performance of data channels that otherwise may exhibit larger fluctuations in time due to a polarization hole burning (PHB) effect in the amplifiers 116, polarization dependent loss (PDL) and polarization mode dispersion (PMD) effects in the fiber 105 and optical components of the fiber-optic transmission span 102, as well as due to inter-channel interactions. In the fiber-optic transmission span 102 having narrow channel spacing (e.g., 50 GHz or less), such inter-channel interactions generally arise as a result of operating the fiber 105 in a non-linear mode.

Figure 2:
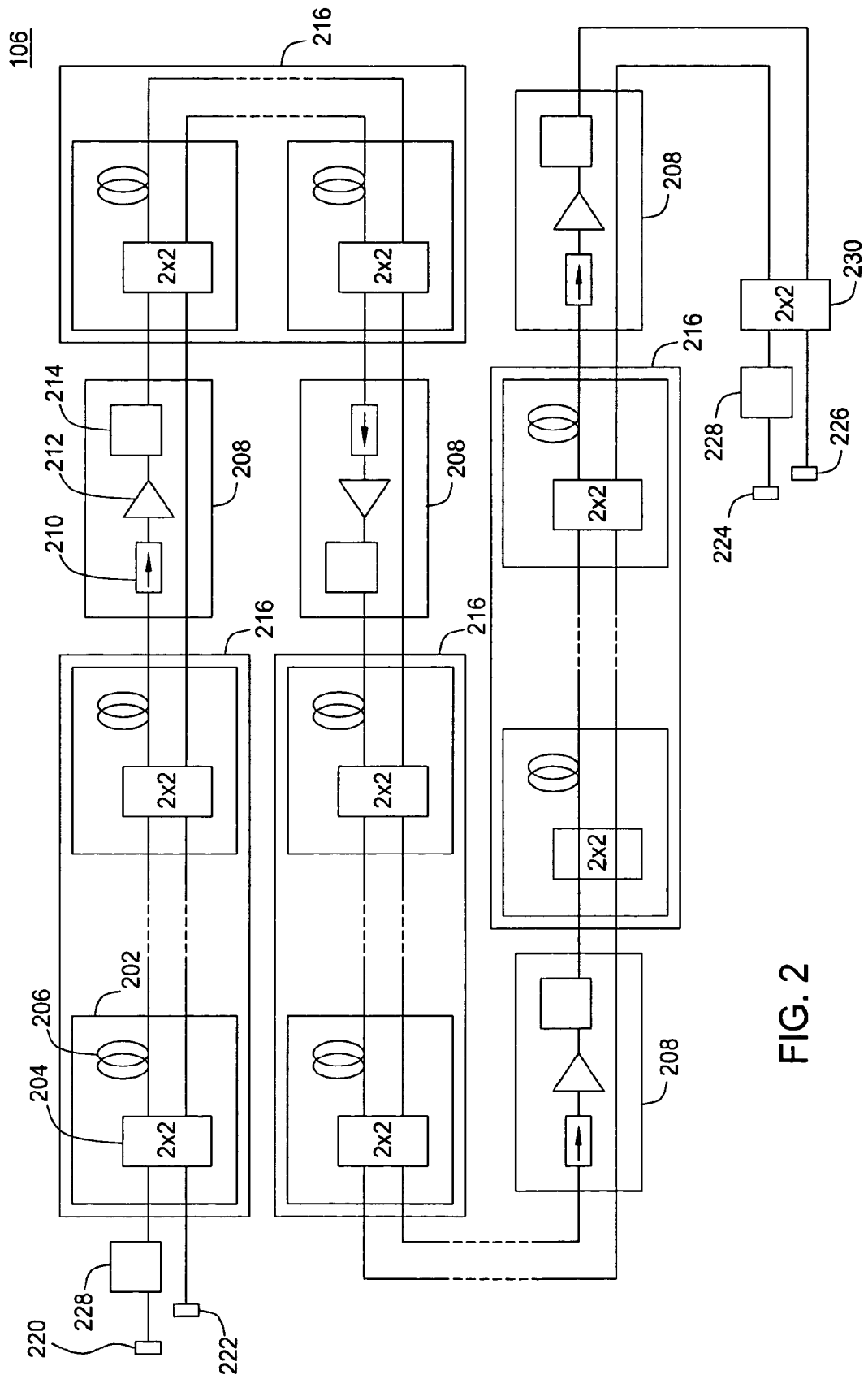
FIG. 2 is a schematic diagram of a broadband dispersion compensation unit (DCU) of the apparatus of FIG. 1.

FIG. 2 depicts a schematic diagram of the broadband DCU 106 (e.g., broadband DCU 106A) of the apparatus 100 of FIG. 1. In one embodiment, the broadband DCU 106 comprises a plurality of sections 216 and a plurality of amplifying modules 208, as well as at least one optional optical attenuator 228 (one attenuator 228 is shown), at least one optional fiber-optic switch 230 (one switch 230 is shown) and at least one auxiliary fiber coupler (not shown).

Each section 216 includes a plurality of segments 202, each such segment comprising a 2×2 switch 204 and a fiber spool 206. An amplifying module 208 includes a fiber-optic isolator 210, a fiber-optic amplifier 212 (e.g., erbium-doped fiber-optic amplifier), and a fiber-optic attenuator 214. Illustratively, the broadband DCU 106 uses the attenuators 228 and switches 230 of the same type as the attenuators 214 and switches 204, respectively. The attenuators 228 and switches 230 typically are coupled at the optical input 220 and the optical output 224 of the broadband DCU 106 (as shown) and, optionally, may be disposed between adjacent sections 216 and amplifying modules 208.

The attenuators 214, 228 and the switches 204, 230, as well as amplifying modules 208, each may be selectively controlled using the CPU 108 (e.g., CPU 108A). In the depicted embodiment, the broadband DCU 106 further comprises a test input 222 and a test output 226 that, in operation, are used to verify settings of the switches 204 and 230 and optical performance of the amplifying modules 208. In one embodiment, the gain in amplifying modules 208 is selectively adjusted to compensate for losses of the light propagating through the broadband DCU 106.

Each of the spools 206 has, at a central wavelength of data channels in the fiber-optic transmission span 102, dispersion of the pre-determined sign and value. Herein, the term "dispersion" refers to chromatic dispersion (i.e., dependence of the group velocity in the light-propagating medium from a wavelength or frequency of the light).

The dispersion range of the broadband DCU 106 can be from at least about +/−100 ps/nm to any dispersion range needed to optimize a system. In one exemplary embodiment, an accumulated dispersion range of the broadband DCU 106 is about +/−3500 ps/nm and a dispersion step size is about 50 ps/nm. In this embodiment, the broadband DCU comprises, from the input 220 to the output 224, a first section 216 including spools 206 having dispersion +1088 ps/nm and −1088 ps/nm; a second section 216 including spools 206 having dispersion +1088 ps/nm and −1632 ps/nm; a third section 216 including spools 206 having dispersion +544 ps/nm and −544 ps/nm; a fourth section 216 including spools 206 having dispersion +272 ps/nm and +136 ps/nm; and a fifth section 216 including spools 206 having dispersion +68 ps/nm, +34 ps/nm, and +17 ps/nm, respectively.

Figure 3:
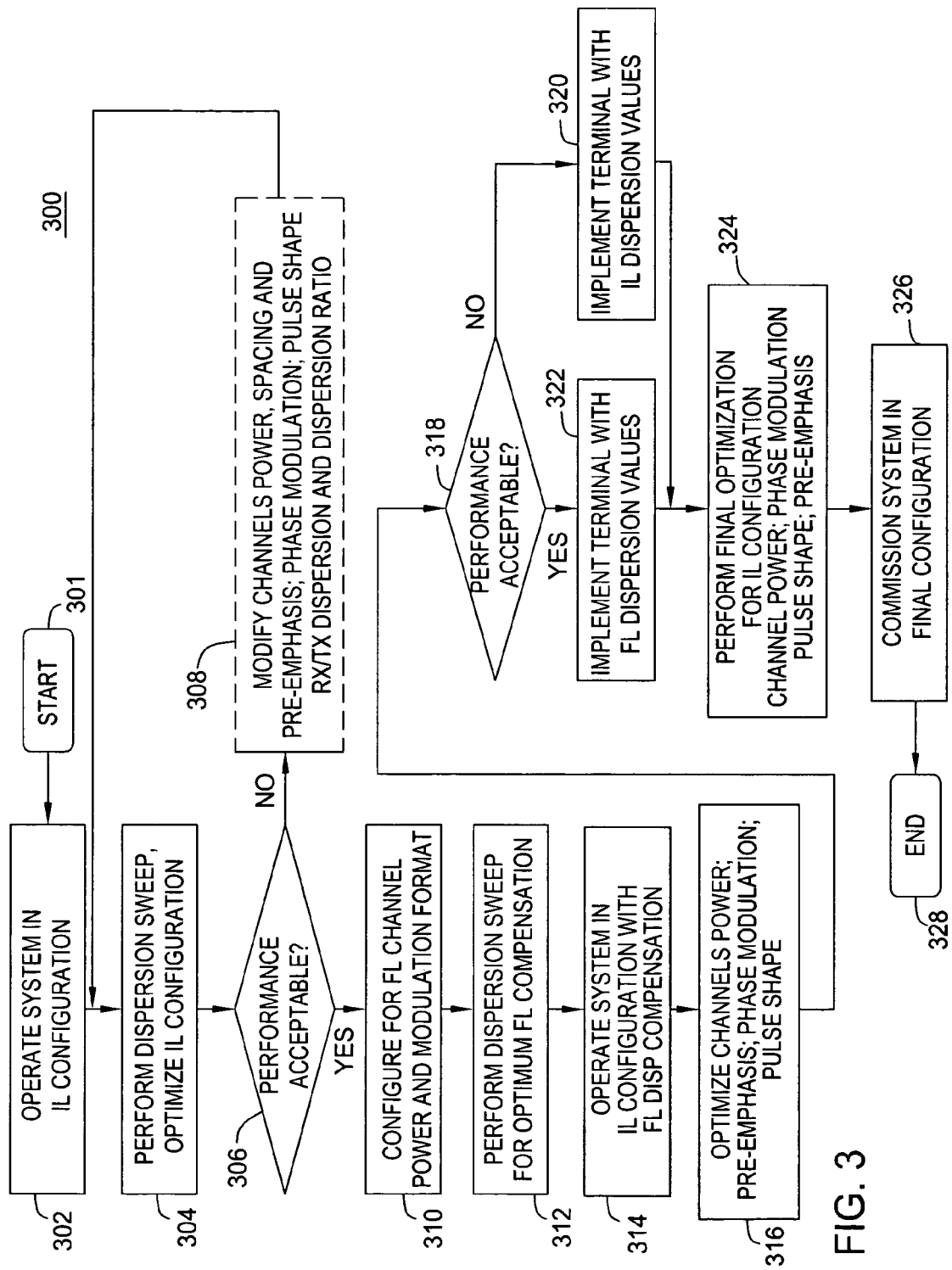
FIG. 3 is a flow diagram of a method for testing and optimizing an optical transmission system using the apparatus of FIG. 1 in accordance with one embodiment of the present invention.

FIG. 3 depicts a flow diagram of a process in accordance with one embodiment of the inventive method for commissioning the optical transmission system 150 using the apparatus 100 of FIG. 1. In a preferred embodiment, the apparatus 100 includes the broadband DCUs 106A, 106B and the depolarization device 114. The process 300 illustratively includes the processing steps performed to test and optimize performance (i.e., transmission quality) of data channels of the optical transmission system 150. To best understand this embodiment of the present invention, the reader should jointly refer to FIGS. 1 and 3.

The process 300 starts at step 301 and proceeds to step 302. At step 302, the optical transmission system 150 is operated in accordance with initial, or default, design parameters and settings. That includes operating the TX terminal 101 and the RX terminal 103 in an initial loading (IL) configuration of the system 150, where the fiber-optic transmission span 102 is loaded with relatively few data channels. It should be understood that the terms "initial loading" includes operation of the optical transmission system 150 during partial loading of channels as well. That is, when referring to an IL configuration, this includes but is not limited to the initial commissioning of the transmission system as well as partial loading of the system at any time during the life of the system where the system is not fully loaded with data channels.

In one embodiment, such data channels are selectively distributed within an optical bandwidth of the fiber-optic transmission span 102. In a further embodiment, at least one loading channel may be selectively disposed adjacent the data channels.

Spectral position and optical power in each data or loading channel may individually be controlled at the TX terminal 101, by modifying wavelength and output power of individual transmitters and/or loss of the optical path through the TX terminal for individual optical channels. Additionally, at the TX terminal 101, a form factor (i.e., shape) of a data pulse, a choice of a modulation format (e.g., at least one of a Return-to-Zero (RZ) format, a Non-Return-to-Zero (NRZ) format, a Chirped Return-to-Zero (CRZ) format, a Return-to-Zero Differential Phase Shift Keying (RZ-DPSK) format, a Non-Return-to-Zero Differential Phase Shift Keying (NRZ-DPSK) format (or any other modulation formats used in optical transmission systems)) and an amount of phase modulation may selectively be controlled in each data channel. Furthermore, at the RX terminal 103, decision thresholds for optical signals (module 124) and electronic signals (module 120) may selectively be controlled for each data channel. In one embodiment, at step 302, in the data channels, optical signal-to-noise ratio (OSNR) is equalized and the amount of phase modulation is set to 0 or a value that corresponds to full loading (FL) conditions if different from 0.

At step 304, a dispersion sweep is performed in the apparatus 100. In one embodiment, the dispersion sweep defines substantially close to optimal pre-compensation dispersion settings (i.e., dispersion settings in the TX terminal equipment 104) for the data channels. The dispersion sweep is typically performed initially as a series of coarse steps (e.g., about 100-200 ps/nm steps) followed by a series of fine steps (e.g., about 10-40 ps/nm steps) depending on the bit rate of the data channels. Prior to the dispersion sweep, the data channel power is increased by changing the relative power between loading channels and data channels to increase the sensitivity of transmission performance to changes in dispersion compensation values. The increased power of the initial channels to values above their normal operating point allows for better identification of the optimum dispersion setting.

During the IL configuration stage, the system 150 may be initially loaded by applying a multitude of techniques to lower the channel power of the few channels that have been originally commissioned with the system. By way of example only, certain techniques include applying loading channels having relatively high optical power and wide channel spacing. Another technique is to load the system with noise. There also may be variations of the two previously mentioned techniques and are contemplated by the present invention. When referring to "loading channels" throughout this patent application, it should be understood by one of ordinary skill in the art that any one of the techniques mentioned above or any equivalent techniques may be substituted for the term "loading channel" and that "loading channel" is being used for simplicity only. Equally, the term "loading channels" also may be used to cover any acceptable technique of loading the system during the IL stage having a relatively small amount of data channels to emulate FL conditions.

The dispersion sweep may be performed using either the broadband DCU 106B or the broadband DCU 106A or a combination of both depending on system design. When the system is non-linear, to define the optimal ratio between post-compensation dispersion settings (i.e., dispersion settings for the RX terminal 103) and the pre-compensation dispersion settings, the dispersion sweep is performed using both the broadband DCU 106A and the broadband DCU 106B. In this case, the broadband DCU 106A and broadband DCU 106B define the post-compensation and pre-compensation dispersion settings, respectively, and the optimized settings for the broadband DCUs are derived from a two-dimensional matrix of the test data for the data channels. If the system is linear, a one-dimensional matrix sweep may be performed using either broadband DCU (106A or 106B) to determine optimum net dispersion compensation. In this case, the split ratio between TX and RX compensation is not a performance determining factor.

At step 306, the process 300 queries if all data channels have met the acceptance limits (i.e., data transmission performance requirements). If the query of step 306 is negatively answered, the process 300 proceeds to step 308.

At step 308, parameters and settings of components of the apparatus 100 and the system 150 are selectively modified, using at least one of several commissioning testing techniques that, together, form a multi-dimensional test space. Illustratively, a matrix of such techniques may include iterative procedures of incrementally changing the performance-defining parameters of the system 150, e.g., a ratio between post-compensation and pre-compensation dispersion settings, channel power, a data/loading channel power ratio (i.e., pre-emphasis), spacing between data and loading channels, the amount of phase modulation, the optical pulse shape, and the like.

During step 308, modified parameters and settings are sequentially implemented in the apparatus 100 and the system 150. Then, performance of the data channels is repetitively tested to define optimal IL settings, as described above with reference to step 304. Cyclical tests in a sub-loop comprising steps 308, 304, and 306 continue until performance of the data channels meets pre-determined acceptance limits.

If the query of step 306 is affirmatively answered, the process 300 proceeds to step 310. At step 310, the optical transmission system 150 is configured for emulating operation in the full loading (FL) configuration. In this step, the IL configuration is operated to reflect channel power and a modulation format that corresponds to the FL configuration. The FL configuration corresponds to the system 150 fully loaded with data channels generally having lower optical power per channel, narrower channel spacing and a modulation format chosen to accommodate the narrow channel spacing of the FL configuration.

In one embodiment, the FL configuration is emulated using a comb technique that applies a plurality of depolarized loading channels disposed in place of the data channels and a plurality of the data channels interstitially disposed between the loading channels. The loading scheme provides for the removal of individual loading channels as the system 150 progresses from initial transmission capacity (IL configuration), through upgrades, towards the full capacity in the FL configuration. This loading technique is described in a printed publication by B. Bakhshi, W. W. Patterson, J. Leanza, D. Duff, E. A. Golovchenko, M. Nissov, D. I. Kovsh, M. Vaa, D. Sliwinski, R. L. Maybach, K. Razavi, M. Arend, T. Becker, and S. Jimenez, entitled: *Optical Test Equipment for Performance Evaluation of Installed DWDM Systems*, Techn. Dig. OFC 2002, paper TuY3, pp. 166-168, Anaheim, Calif., March 2002 and U.S. Pat. No. 6,147,796, the entireties of which are herein incorporated by reference. In an alternate embodiment, the loading channels are replaced with noise.

At step 312, another dispersion sweep is performed in the apparatus 100 to achieve another dispersion optimization. This will yield the optimal accumulated dispersion balance for an emulated FL configuration but still with baseline of the IL configuration. The dispersion sweep defines substantially close to optimal pre-compensation and post-compensation dispersion settings for the data channels in the FL configuration of the system 150 and may be performed using the methodology described above with reference to step 304. The FL configuration includes channel power and modulation format.

At step 314, the system is then re-configured or operated for the IL configuration (also in terms of channel power and modulation format) using FL optimum dispersion compensation values derived in step 312.

At step 316, optimization is again performed. The performance of the data channels in the IL configuration with FL dispersion compensation values is selectively modified by iterative adjustments of channel powers, pre-emphasis, phase modulation or pulse shape. At this step, the channel allocation is not modified. The modified parameters of step 316 are sequentially implemented in the apparatus 100 and the system 150. Then, performance of the data channels is repetitively tested to define optimized IL settings.

At step 318, the process 300 queries if the performance is acceptable. That is, if all data channels have met the acceptance limits (i.e., data transmission performance requirements). If the query of step 318 is negatively answered, the process 300 proceeds to step 320.

At step 320, the TX and RX terminals are configured with accumulated dispersion values derived in a previous step to be optimum for IL configuration (step 304) and the process proceeds to step 324.

If the query of step 318 is affirmatively answered, then the system is able to get the IL configuration to work if optimized dispersion values are applied that will yield optimum FL operation. The TX and RX terminals are implemented or configured at step 322 with accumulated dispersion values found to be optimum for the FL configuration (step 304) and the process proceeds to step 324.

At step 324, the apparatus 100 is disconnected from the system 150, the fiber-optic transmission span 102 is coupled (e.g., spliced) to the TX terminal 101 and RX terminal 103, and the defined optimized settings and parameters are implemented in the terminals 101 and 103. The data channels performance is optimized in the IL configuration using the final implementation of terminal dispersion compensation values by iteratively adjusting the parameters mentioned in step 316.

At step 326, the system is commissioned to commercial operation in its final IL configuration. At step 328, the process 300 ends.

It should be understood by one of ordinary skill in the art that when parameter optimization is discussed, it includes receiver parameter optimization as well. Specifically, when parameter optimization is performed on the system or on individual channels, whenever there is a change to a parameter on the transmitter side, parameter optimization or re-optimization is performed on the receiver side as well. Such parameters include, but are not limited to, sampling time and decision threshold.

While the foregoing is directed to embodiments of the present invention, other and further embodiments of the invention may be devised without departing from the basic scope thereof, and the scope thereof is determined by the claims that follow.

The invention claimed is:

1. An apparatus for testing and optimizing performance of an optical transmission system including a transmitting terminal for transmitting a plurality of wavelength division multiplexed optical signal channels in an optical bandwidth of said transmission system, a receiving terminal for receiving said plurality of optical signal channels, and a fiber-optic transmission span having an input fiber and an output fiber, both coupled between the transmitting and receiving terminals, the apparatus comprising:
   at least one broadband dispersion compensation unit (DCU) coupled to the fiber-optic transmission span, said broadband DCU being configured for selectively adding a common amount of dispersion compensation across said optical bandwidth and for performing a dispersion sweep by varying the dispersion compensation of at least two of said optical signal channels in a series of steps.

2. The apparatus of claim 1, wherein the at least one broadband DCU is coupled between the transmitting terminal and the input fiber of the fiber-optic transmission span.

3. The apparatus of claim 2, further comprising a depolarization device coupled to an optical input of the at least one broadband DCU.

4. The apparatus of claim 2, further comprising a depolarization device, wherein an optical output of the at least one broadband DCU is coupled to an optical input of the depolarization device, and an optical output of the depolarization device is coupled to the input fiber of the fiber-optic transmission span.

5. The apparatus of claim 1, wherein the at least one broadband DCU is coupled between the output fiber of the fiber-optic transmission span and the receiving terminal.

6. The apparatus of claim 1, wherein the at least one broadband DCU comprises a first and second broadband DCU.

7. The apparatus of claim 6, wherein the first broadband DCU is coupled between the transmitting terminal and the input fiber of the fiber-optic transmission span and the second broadband DCU is coupled between the output fiber of the span and the receiving terminal.

8. The apparatus of claim 7, further comprising a depolarization device coupled between the transmitting terminal and an optical input of the first broadband DCU.

9. The apparatus of claim 7, further comprising a depolarization device coupled between an optical output of the first broadband DCU and the input fiber of the fiber-optic transmission span.

10. The apparatus of claim 1, wherein the at least one broadband DCU comprises a computer for controlling the amount of dispersion the at least one broadband DCU adds across said optical bandwidth.

11. The apparatus of claim 1, wherein the amount of dispersion compensation from the at least one broadband DCU ranges from at least about ±100 ps/nm.

12. The apparatus of claim 1, wherein the broadband DCU comprises a plurality of sections, each section including at least one fiber spool having a pre-determined amount of dispersion, and a controlled switch.

13. The apparatus of claim 12, wherein the broadband DCU further comprises at least one amplifying module coupled between adjacent sections and compensating for a portion of optical losses in the broadband DCU.

14. The apparatus of claim 13, wherein the at least one amplifying module comprises a fiber-optic isolator, a fiber-optic amplifier, and a fiber-optic attenuator.

15. An apparatus for testing and optimizing performance of an optical transmission system including a transmitting terminal for transmitting a plurality of wavelength division multiplexed (WDM) optical signal channels in an optical bandwidth of said transmission system, a receiving terminal for receiving said plurality of WDM optical signal channels, and a fiber-optic transmission span having an input fiber and an output fiber and coupled between the transmitting and receiving terminals, the apparatus comprising:
   at least one depolarization device for depolarizing a plurality of said optical signal channels transmitted on the optical transmission system; and
   means for performing a dispersion sweep by varying the dispersion compensation of at least two of said optical signal channels and measuring performance of said at least two optical signal channels to optimize an initial loading (IL) configuration.

16. The apparatus of claim 15, wherein the at least one depolarization device is a polarization scrambler.

17. The apparatus of claim 15, wherein the means comprises at least one broadband dispersion compensation unit (DCU).

* * * * *